United States Patent [19]
Kizu et al.

[11] Patent Number: 5,875,475
[45] Date of Patent: Feb. 23, 1999

[54] CONTINUOUS DATA SERVER APPARATUS AND METHOD FOR CONTROLLING CONTINUOUS DATA SERVER

[75] Inventors: Toshiki Kizu; Tatsunori Kanai; Hiroshi Yao, all of Kanagawa; Seiji Maeda, Tokyo, all of Japan

[73] Assignee: Kabushiki Kaishi Toshiba, Kawasaki, Japan

[21] Appl. No.: 707,940

[22] Filed: Sep. 10, 1996

[30] Foreign Application Priority Data

Sep. 11, 1995 [JP] Japan .................................. 7-232515

[51] Int. Cl.[6] .......................... G06F 13/00; H04N 7/173
[52] U.S. Cl. ................................ 711/154; 711/114; 348/7; 395/391
[58] Field of Search ..................... 711/114, 154; 395/391, 390, 566; 348/7

[56] References Cited

U.S. PATENT DOCUMENTS 5,553,005 9/1996 Voeten et al. ............................ 386/125
5,603,058 2/1997 Belknap et al. ......................... 395/855
5,625,405 4/1997 DuLac et al. ............................. 348/7

*Primary Examiner*—Glenn Gossage
*Attorney, Agent, or Firm*—Foley & Lardner

[57] ABSTRACT

A continuous data server capable of reducing a cost for issuing control commands from a central control device to data memory control devices and communication control devices. The central control device issues a control command for each data memory control device and a control command for each communication control device collectively as a single control command set. Alternatively, the central control device issues control commands for the data memory control devices collectively as a single first control command set, and control commands for the communication control devices collectively as a single second control command set, through separately provided communication paths. When the continuous data are striped over data memory devices, the central control device can issue a common control command for all the data memory control devices.

18 Claims, 17 Drawing Sheets

FIG.6

| | |
|---|---|
| BLOCK NUMBER OF DATA MEMORY DEVICE (#1) TO BE READ | ⎫ |
| ADDRESS OF BUFFER MEMORY DEVICE TO BE WRITTEN | ⎪ CONTROL COMMAND FOR DATA MEMORY CONTROL DEVICE (#0) |
| BLOCK NUMBER OF DATA MEMORY DEVICE (#2) TO BE READ | ⎬ |
| ADDRESS OF BUFFER MEMORY DEVICE TO BE WRITTEN | ⎭ |
| BLOCK NUMBER OF DATA MEMORY DEVICE (#1) TO BE READ | ⎫ |
| ADDRESS OF BUFFER MEMORY DEVICE TO BE WRITTEN | ⎪ CONTROL COMMAND FOR DATA MEMORY CONTROL DEVICE (#1) |
| BLOCK NUMBER OF DATA MEMORY DEVICE (#2) TO BE READ | ⎬ |
| ADDRESS OF BUFFER MEMORY DEVICE TO BE WRITTEN | ⎭ |
| ADDRESS OF BUFFER MEMORY DEVICE STORING DATA FOR CONTINUOUS DATA RECEIVER #0 | ⎫ |
| ADDRESS OF BUFFER MEMORY DEVICE STORING DATA FOR CONTINUOUS DATA RECEIVER #1 | ⎬ CONTROL COMMAND FOR COMMUNICATION CONTROL DEVICE (#0) |
| ADDRESS OF BUFFER MEMORY DEVICE STORING DATA FOR CONTINUOUS DATA RECEIVER #2 | ⎭ |
| ADDRESS OF BUFFER MEMORY DEVICE STORING DATA FOR CONTINUOUS DATA RECEIVER #3 | ⎫ |
| ADDRESS OF BUFFER MEMORY DEVICE STORING DATA FOR CONTINUOUS DATA RECEIVER #4 | ⎬ CONTROL COMMAND FOR COMMUNICATION CONTROL DEVICE (#1) |
| ADDRESS OF BUFFER MEMORY DEVICE STORING DATA FOR CONTINUOUS DATA RECEIVER #5 | ⎭ |

FIG.11A CONTINUOUS DATA A: a1, a2, a3, a4, a5, a6, a7, a8, a9, a10, a11, a12, a13, a14, ......, a64

FIG.11B CONTINUOUS DATA B: b1, b2, b3, b4, b5, b6, b7, b8, b9, b10, b11, b12, b13, b14, ......, b64

FIG.11C CONTINUOUS DATA C: c1, c2, c3, c4, c5, c6, c7, c8, c9, c10, c11, c12, c13, c14, ......, c64

FIG.11D CONTINUOUS DATA D: d1, d2, d3, d4, d5, d6, d7, d8, d9, d10, d11, d12, d13, d14, ......, d64

FIG.17

| |
|---|
| DATA MEMORY DEVICE NUMBER |
| BLOCK NUMBER |
| OFFSET OF BUFFER MEMORY DEVICE FOR WRITING READ OUT DATA |
| ⋮ |
| DATA MEMORY DEVICE NUMBER |
| BLOCK NUMBER |
| OFFSET OF BUFFER MEMORY DEVICE FOR WRITING READ OUT DATA |

FIG.18

| |
|---|
| BUFFER ADDRESSES TO BE WRITTEN BY DATA MEMORY CONTROL DEVICE (#1) |
| BUFFER ADDRESSES TO BE WRITTEN BY DATA MEMORY CONTROL DEVICE (#2) |
| BUFFER ADDRESSES TO BE WRITTEN BY DATA MEMORY CONTROL DEVICE (#3) |
| BUFFER ADDRESSES TO BE WRITTEN BY DATA MEMORY CONTROL DEVICE (#4) |

CONTINUOUS DATA SERVER APPARATUS AND METHOD FOR CONTROLLING CONTINUOUS DATA SERVER

BACKGROUND OF THE INVENTION

1. Field of the Invention

The present invention relates to a continuous data server for realizing services of continuous data such as video data and speech data by responding to a plurality of access requests for the continuous data simultaneously, and a method for controlling a continuous data server.

2. Description of the Background Art

A continuous data server apparatus for handling continuous data such as video data and speech data has functions for reading out the continuous data stored in memory devices, and transferring the data continuously in real time while synchronizing in time with terminal devices. Such a continuous data server apparatus is used in fields such as a video-on-demand in which video data for a plurality of movies, etc. are stored and an arbitrary movie is transferred according to a request from a terminal, and an on-line shopping in which information on commercial products is provided in video data through a network.

In such applications, the continuous data server apparatus will receive requests from a plurality of users at random, and therefore the continuous data server apparatus is required to have a capability to transfer respectively different continuous data to many different users simultaneously.

Now, some examples of such a conventional continuous data server apparatus will be described in detail.

An exemplary conventional continuous data server apparatus has a configuration as shown in FIG. 1.

In this conventional continuous data server apparatus of FIG. 1, an access request for the continuous data issued by a user or an application program will be sent through an inter-process communication, a communication via a network, etc. This access request is then notified from one of communication control devices 706 through a bus 720 to a central control device 710, and accepted by the central control device 710.

The central control device 710 then notifies the reading of the requested continuous data to relevant data memory control devices 704, and these data memory control devices 704 read out the specified continuous data from data memory devices 702 and write them into a buffer memory device 708. The central control device 710 then commands the transfer of the data in the buffer memory device 708 to one of the communication control devices 706, and this communication control device 706 transfers the continuous data toward a transfer destination specified in the access request.

The central control device 710 basically comprises a central processing unit (CPU) and a memory device, similarly as an electronic computer. The central control device 710 may be equipped with a communication control function for the purpose of notifying the access request, so that the access request from a user or an application program is notified by the communication control function of the central control device 710 rather than by the communication control device 706.

The data memory devices 702 for storing the continuous data are usually provided in forms of disk devices. For this disk device, a magnetic disk device is used in most cases, but there is also a case of using an optical disk or an opto-magnetic disk device, etc. Apart from the disk device, there is also a case of using a semiconductor memory device such as random access memory (RAM) or electrically erasable programmable read only memory (EEPROM) for the data memory devices 702.

In the conventional continuous data server apparatus of FIG. 1, in order to transfer the continuous data, it is necessary for the central control device 710 to issue control commands to the data memory control devices 704 and the communication control devices 706 through the bus 720 so as to carry out a reading of the continuous data from the data memory devices 702 by the data memory control devices 704 and a transfer of the continuous data to a communication path by the communication control devices 706.

However, in order to realize a transfer of many continuous data, a need to increase the number of data memory control devices 704, data memory devices 702, and communication control devices 706 may arise, and when this need is fulfilled, an amount of communications for the control commands to the data memory control devices 704 and the communication control devices 706 also increases. The central control device 710 is required to issue as many control commands for each data memory control device 704 as the number of data memory control devices 704 each in a size proportional to the number of data memory devices 702 connected to each data memory control device 704, and as many control commands for each communication control device 706 as the number communication control devices 706 in a size proportional to a number of continuous data to be transferred by each communication control device 706, all through the bus 720.

Consequently, there has been a problem of an increasing load on the bus 720 for connecting the central control device 710 with the data memory control devices 704 and the communication control devices 706. In addition, there is a need to issue the control commands for a plurality of times, so that there has also been a problem of delays in control commands for the data memory control devices 704 and the communication control devices 706.

On the other hand, there is another example of a conventional continuous data server apparatus using a configuration as shown in FIG. 2 which utilizes a massively parallel computer in which a plurality of central control devices (CPU) 910 and 911 are connected by a switch (coupling path) 921 with a large data transfer capability (bandwidth).

In this configuration of FIG. 2, it is necessary for the switch 921 connected between the central control devices 910 and 911 to be capable of handling the data transfer between the central control device 910 that has an arbitrary data memory control device 904 and the central control device 911 that has an arbitrary communication control device 906. For this reason, a multi-stage network such as the crossbar switch, the hypercube, or the ATM (Asynchronous Transfer Mode) network will be used for this switch 921.

However, even in this conventional continuous data server apparatus of FIG. 2, the central control devices 910 and 911 are required to issue as many control commands for each data memory control device 904 as the number of data memory control devices 904 each in a size proportional to the number of data memory devices 902 connected to each data memory control device 904, and as many control commands for each communication control device 906 as the number of communication control devices 906 each in a size proportional to the number of continuous data to be transferred by each communication control device 906, all through the switch 921.

Consequently, there has been a problem of an increasing load on the switch 921 for connecting the central control devices 910 and 911 with the data memory control devices 904 and the communication control devices 906. In addition, there is a need to issue the control commands a plurality of times, so that there has also been a problem of delays in control commands for the data memory control devices 904 and the communication control devices 906.

Thus, the conventional continuous data server apparatus has been associated with a problem concerning an increase of a processing load for issuing the control commands from the central control device to the data memory control devices and the communication control devices in proportion to the number of data memory control devices and the number of communication control devices.

SUMMARY OF THE INVENTION

It is therefore an object of the present invention to provide a continuous data server apparatus and a continuous data server control method capable of reducing a processing load for issuing the control commands from the central control device to the data memory control devices and the communication control devices.

According to one aspect of the present invention there is provided a continuous data server apparatus, comprising: n sets of data memory control devices for reading out desired continuous data from data memory devices storing continuous data, where n is an integer not less than one; a buffer memory device for holding the desired continuous data read out by the data memory control device; m sets of communication control devices for transferring the desired continuous data held in the buffer memory device to an externally communication path, where m is an integer not less than one; a central control device for controlling the data memory control devices and the communication control devices by issuing control commands; and at least one internal communication path for interconnecting the central control device with the data memory control devices and the communication control devices; wherein the central control device issues a control command for each data memory control device and a control command for each communication control device collectively as a single control command set through the internal communication path.

According to another aspect of the present invention there is provided a continuous data server apparatus, comprising: n sets of data memory control devices for reading out desired continuous data from data memory devices storing continuous data, where n is an integer not less than one; a buffer memory device for holding the desired continuous data read out by the data memory control device; m sets of communication control devices for transferring the desired continuous data held in the buffer memory device to an externally communication path, where m is an integer not less than one and m is not equal to one when n is equal to one; a central control device for controlling the data memory control devices and the communication control devices by issuing control commands; at least one first internal communication path for interconnecting the central control device with the data memory control devices; and at least one second internal communication path for interconnecting the central control device with the communication control devices; wherein the central control device issues control commands for the data memory control devices collectively as a single first control command set through the first internal communication path, and control commands for the communication control devices collectively as a single second control command set through the second internal communication path.

According to another aspect of the present invention there is provided a continuous data server apparatus, comprising: a plurality of data memory control devices for reading out desired continuous data from data memory devices storing continuous data, the continuous data being striped over the data memory devices connected with said plurality of data memory control devices; a buffer memory device for holding the desired continuous data read out by the data memory control device; at least one communication control device for transferring the desired continuous data held in the buffer memory device to an externally communication path; a central control device for controlling the data memory control devices and the communication control devices by issuing control commands; and at least one internal communication path for interconnecting the central control device with the data memory control devices; wherein the central control device issues a common control command for all the data memory control devices through the internal communication path.

According to another aspect of the present invention there is provided a method for controlling a continuous data server formed by: n sets of data memory control devices for reading out desired continuous data from data memory devices storing continuous data, where n is an integer not less than one; a buffer memory device for holding the desired continuous data read out by the data memory control device; m sets of communication control devices for transferring the desired continuous data held in the buffer memory device to an externally communication path, where m is an integer not less than one; a central control device for controlling the data memory control devices and the communication control devices by issuing control commands; and at least one internal communication path for interconnecting the central control device with the data memory control devices and the communication control devices; the method comprising the steps of: issuing a control command for each data memory control device and a control command for each communication control device collectively as a single control command set through the internal communication path, from the central control device; extracting at each data memory control device a control command for said each data memory control device from the single control command set, and reading out the desired continuous data from the data memory devices and writing the desired continuous data into the buffer memory device according to extracted control command for said each data memory control device; and extracting at each communication control device a control command for said each communication control device from the single control command set, and reading out the desired continuous data from the buffer memory device and transferring the desired continuous data to the external communication path according to extracted control command for said each communication control device.

According to another aspect of the present invention there is provided a method for controlling a continuous data server formed by: n sets of data memory control devices for reading out desired continuous data from data memory devices storing continuous data, where n is an integer not less than one; a buffer memory device for holding the desired continuous data read out by the data memory control device; m sets of communication control devices for transferring the desired continuous data held in the buffer memory device to an externally communication path, where m is an integer not less than one and m is not equal to one when n is equal to one; a central control device for controlling the data memory control devices and the communication control devices by issuing control commands; at least one first internal communication path for interconnecting the central control device with the data memory control devices; and at least one second internal communication path for interconnecting the central control device with the communication control devices; the method comprising the steps of: issuing control commands for the data memory control devices collectively as a single first control command set through the first internal communication path, and control commands for the communication control devices collectively as a single second control command set through the second internal communication path, from the central control device; extracting at each data memory control device a control command for said each data memory control device from the single first control command set, and reading out the desired continuous data from the data memory devices and writing the desired continuous data into the buffer memory device according to extracted control command for said each data memory control device; and extracting at each communication control device a control command for said each communication control device from the single second control command set, and reads out the desired continuous data from the buffer memory device and transfer the desired continuous data to the external communication path according to extracted control command for said each communication control device.

According to another aspect of the present invention there is provided a method for controlling a continuous data server formed by: a plurality of data memory control devices for reading out desired continuous data from data memory devices storing continuous data, the continuous data being striped over the data memory devices connected with said plurality of data memory control devices; a buffer memory device for holding the desired continuous data read out by the data memory control device; at least one communication control device for transferring the desired continuous data held in the buffer memory device to an externally communication path; a central control device for controlling the data memory control devices and the communication control devices by issuing control commands; and at least one internal communication path for interconnecting the central control device with the data memory control devices; the method comprising the steps of: issuing a common control command for all the data memory control devices through the internal communication path, from the central control device; and reading out the desired continuous data from the data memory devices and writing the desired continuous data into the buffer memory device according to the common control command for all the data memory control devices at each data memory control device.

Other features and advantages of the present invention will become apparent from the following description taken in conjunction with the accompanying drawings.

BRIEF DESCRIPTION OF THE DRAWINGS

FIG. 6 is a diagram illustrating an exemplary configuration of collectively issued control commands in the first embodiment of the present invention.

FIGS. 11A to 11D are diagrams illustrating four exemplary continuous data to be arranged among data memory devices in the third embodiment of the present invention.

FIG. 17 is a diagram illustrating an exemplary configuration of a common control command for data memory control devices in the third embodiment of the present invention.

FIG. 18 is a diagram illustrating an exemplary manner of predetermining buffer addresses for data writing by each data memory control device in the third embodiment of the present invention.

DETAILED DESCRIPTION OF THE PREFERRED EMBODIMENTS

Referring now to FIG. 3 to FIG. 6, the first embodiment of a continuous server apparatus and a continuous data server control method according to the present invention will be described in detail.

Figure 1:
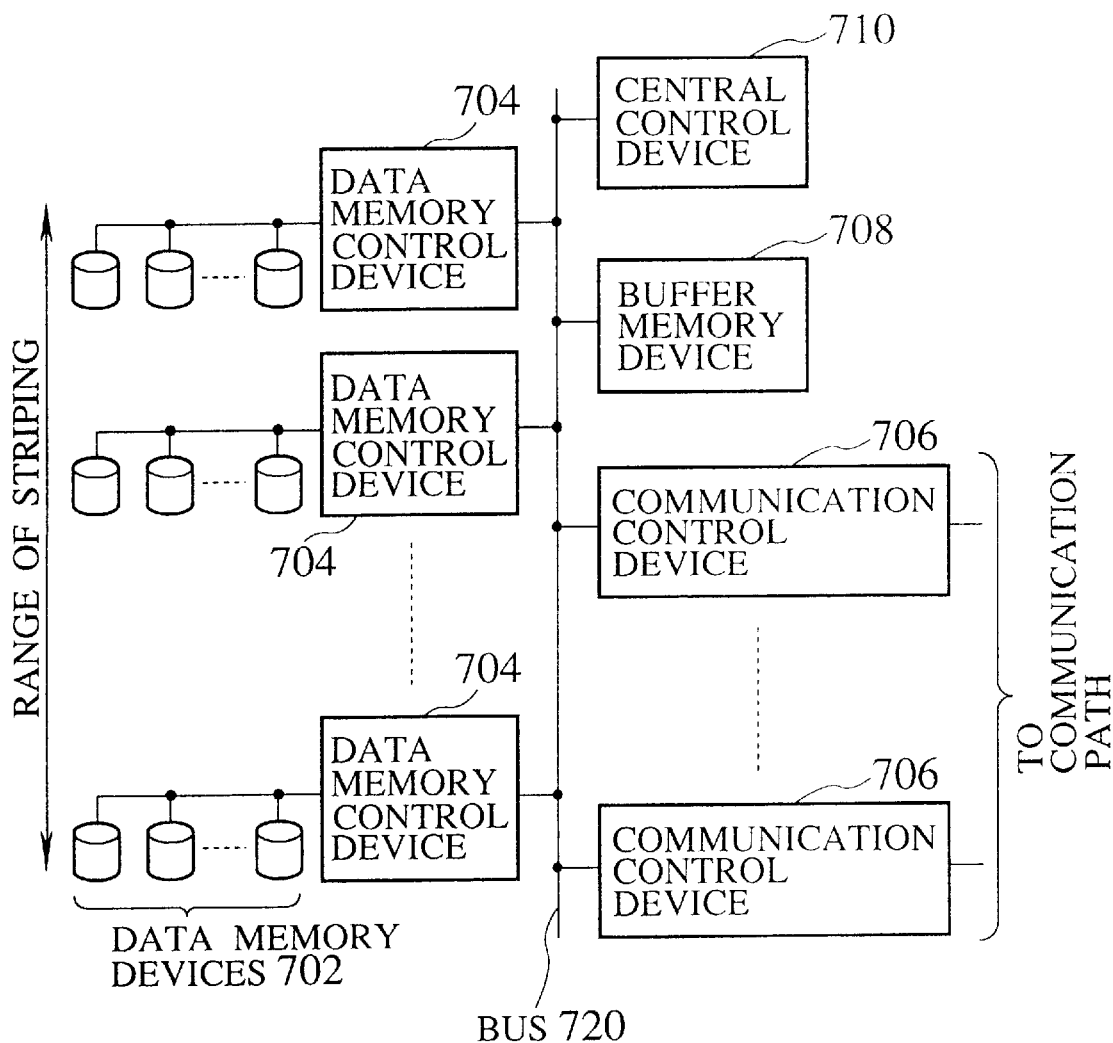
FIG. 1 is a block diagram of one example of a conventional continuous data server apparatus.
Figure 2:
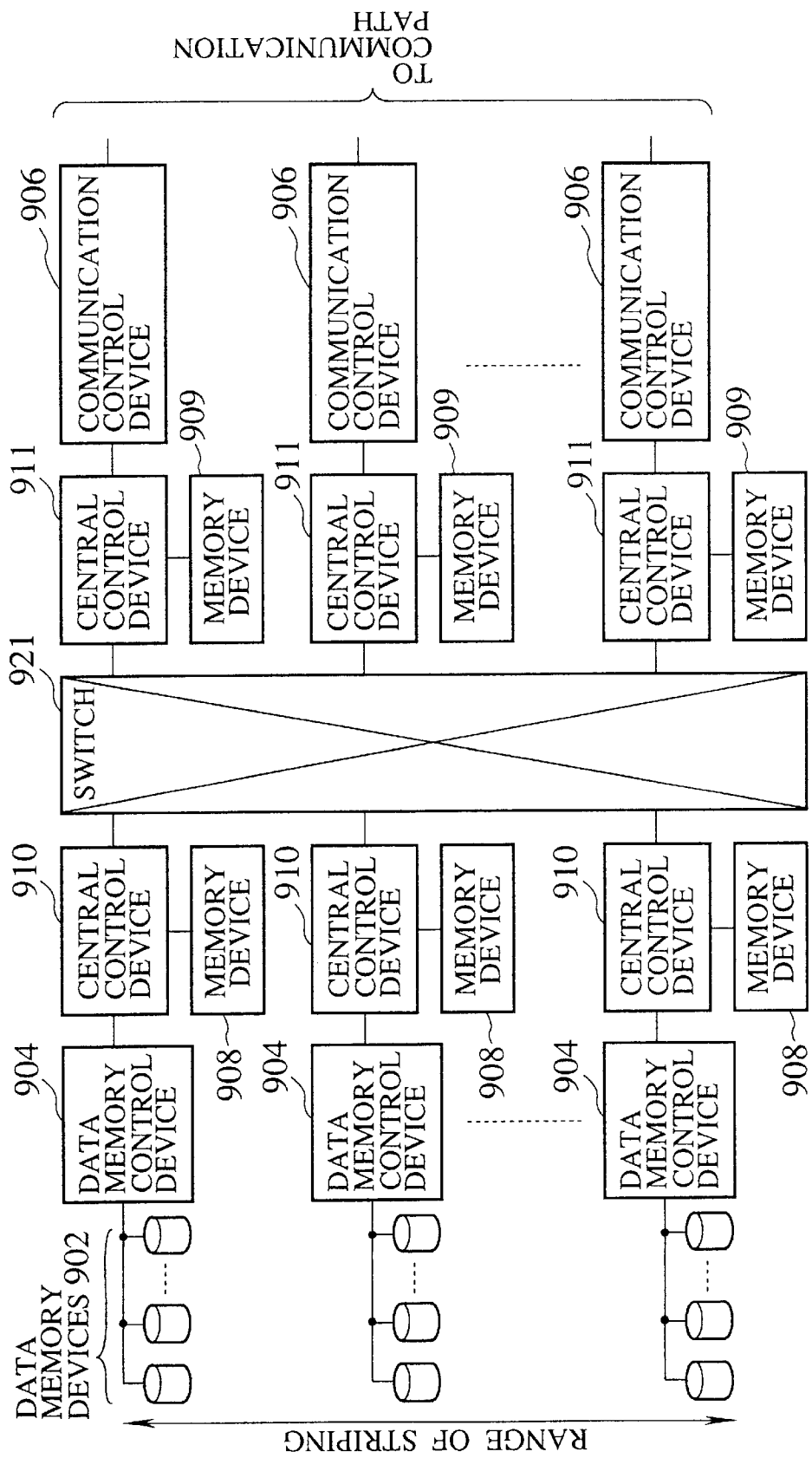
FIG. 2 is a block diagram of another example of a conventional continuous data server apparatus.

In short, this first embodiment is directed to a continuous data server apparatus see (FIG. 1, FIG. 2) including at least one data memory control device to which at least one data memory device for storing continuous data is connected, at least one communication control device for transferring continuous data, and a central control device for controlling the data memory control device and the communication control device which are interconnected through at least one communication path, in which a control command for each data memory control device and a control command for each communication control device are collectively issued as a single control command set see (FIG. 4), so as to reduce a load on the central control device and an amount of communications in a communication path interconnecting the central control device with each data memory control device and each communication control device.

Figure 3:
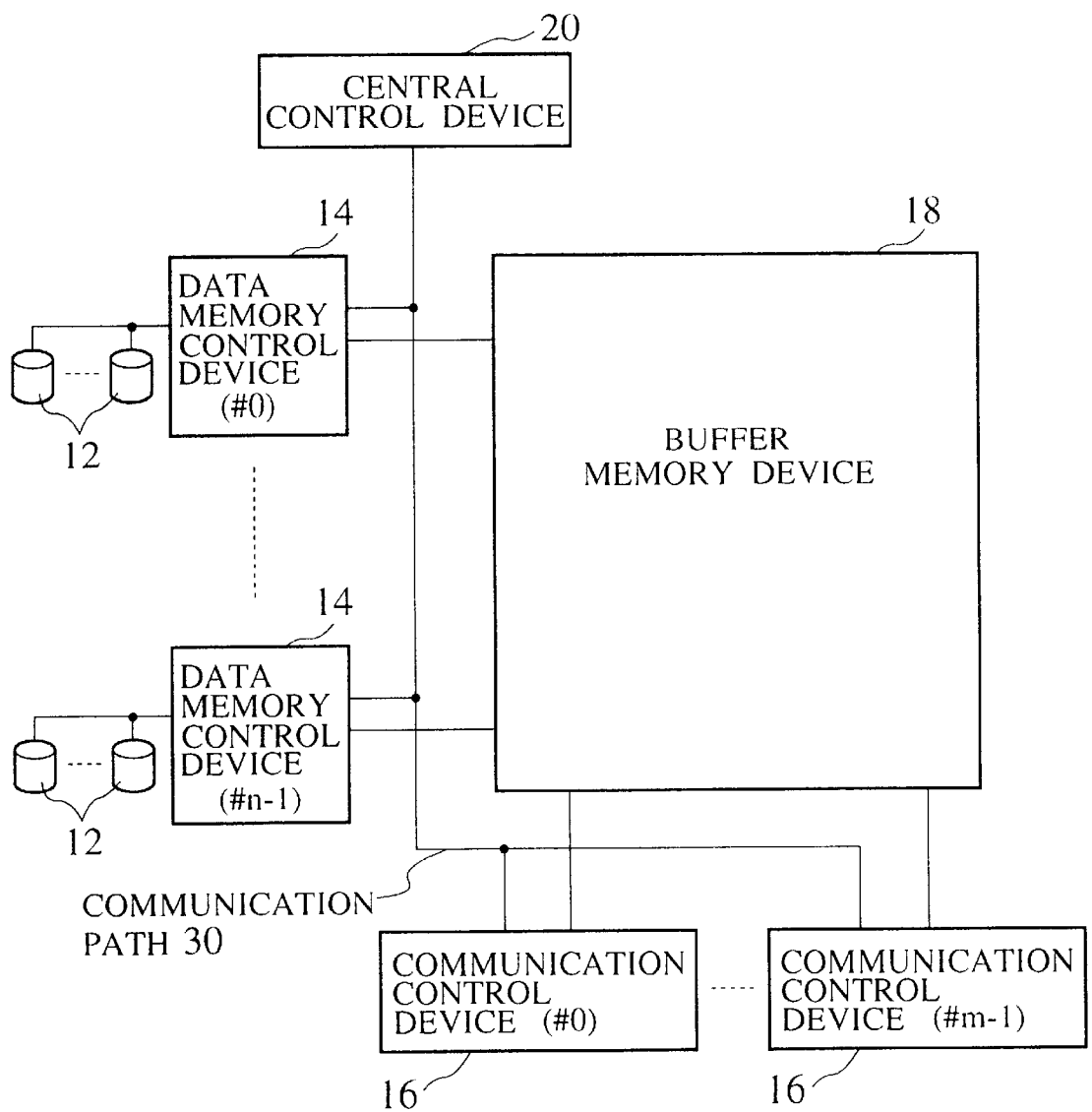
FIG. 3 is a block diagram of a configuration of a continuous data server apparatus in the first embodiment of the present invention.

FIG. 3 shows a configuration of a continuous data server apparatus in this first embodiment.

The continuous data server apparatus of FIG. 3 has n (n is an integer not less than 1) data memory control devices 14, a prescribed number of data memory devices 12 connected to each data memory control device 14, m (m is an integer not less than 1) communication control devices 16, a buffer memory device 18 connected with the data memory control devices 14 and the communication control devices 16, and a central control device 20 connected with each data memory control device 14 and each communication control device 16 through a single communication path 30.

The data memory devices 12 are used for storing the continuous data such as video data and speech data, and are usually provided in forms of disk devices such as magnetic disk devices, optical disk devices, opto-magnetic disk devices, etc. Apart from the disk device, it is also possible to use a semiconductor memory device such as RAM or EEPROM.

Each data memory control device 14 has a prescribed number of data memory devices 12 connected thereto, and is controlled by the central control device 20 to read out the continuous data stored in the data memory devices 12 and writes the read out continuous data into specified addresses of a specified buffer memory device 18.

The buffer memory device 18 is used for temporarily storing the continuous data transferred from the data memory control devices 14.

Each communication control device 16 is controlled by the central control device 20 to read out the continuous data from specified addresses of a specified buffer memory device 18 and transfers the read out continuous data to a communication path such as a network. Here, one or more transfer destinations may be involved.

The central control device 20 for coordinating the control of the entire system is constructed from a CPU, a memory device, and a communication device similarly as a usual electronic computer, and realizes its function by executing on a CPU a program describing the control of the entire system.

In order to control the entire system, the central control device 20 manages, or is capable of knowing, all information within the system such as a specification of each continuous data stored in the system, an arrangement state of each continuous data over the data memory devices 12, communication paths such as networks connected to the system which are available for connection from each communication control device 16, etc.

The central control device 20 receives an access request for the continuous data from a user or an application program which is transmitted by means of a communication through a network, an inter-process communication, a procedure call, etc., and entered from the communication control device 16. Then, the central control device 20 selects the data memory control devices 14 and the communication control devices 16 to be used in responding to that request, and commands those continuous data stored in the data memory devices 12 which are to be transferred and addresses of the buffer memory device 18 to which these continuous data are to be transferred to the data memory control devices 14 and addresses in the buffer memory device 18 of those continuous data which are to be transmitted, and a destination (a receiver) to which these continuous data are to be transmitted to the communication control devices 16.

Next, a method by which the central control device 20 issues the control commands for the data memory control devices 14 and the communication control devices 16 will be described.

In this first embodiment, the central control device 20 issues control commands commanding "which continuous data stored in which data memory devices 12 are to be transferred to which addresses of the buffer memory device 18" to the data memory control devices 14, and control commands commanding "which continuous data at which addresses in the buffer memory device 18 are to be transmitted to where (which receiver)" to the communication control devices 16.

Here, the control commands for the data memory control devices 14 and the commands for the communication control devices 16 are collected together and collectively issued as a single control command set, and the central control device 20 controls all the data memory control devices 14 and the communication control devices 16 by a single transmission of the collectively issued control commands.

This single transmission of the collectively issued control commands to all the data memory control devices 14 and the communication control devices 16 can be realized by interconnecting the central control device 20 with each data memory control device 14 and each communication control device 16 by using a communication path 30 such as an Ethernet, and transmitting the collectively issued control commands by using a broadcast function of a user datagram protocol (UDP) protocol, for example. Here, a packet loss can occur in the communication by the UDP protocol, but the packet loss can be suppressed to the minimum by broadcasting the control command a plurality of times in anticipation of the packet loss.

Figure 4:
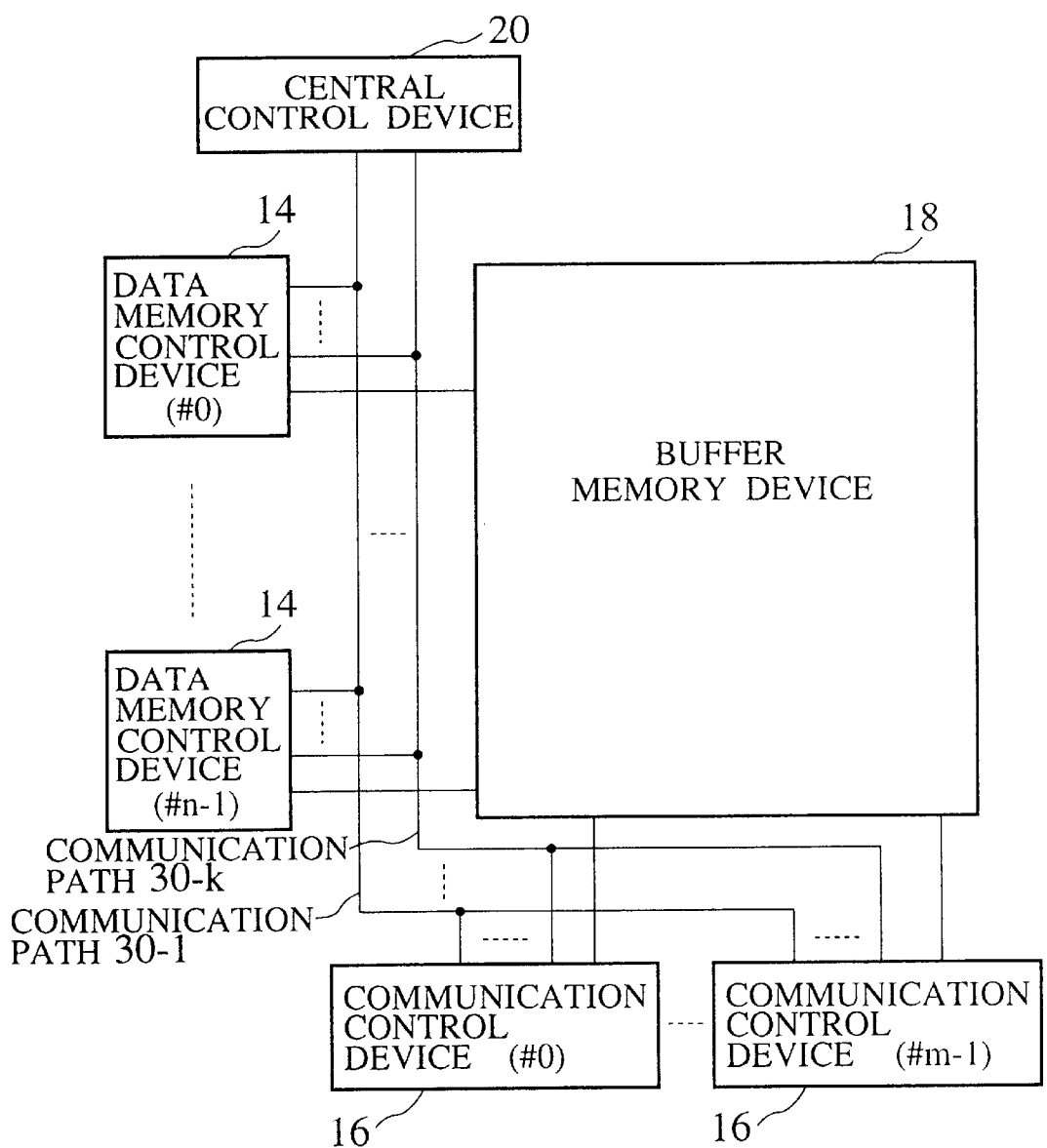
FIG. 4 is a block diagram of a modified configuration of a continuous data server apparatus in the first embodiment of the present invention.

It is also possible to provide a plurality of communication paths 30-1 to 30-k as shown in FIG. 4, instead of a single communication path 30 used in FIG. 3, for interconnecting the central control device 20 with the data memory control devices 14 and the communication control devices 16, so as to improve a tolerance for a trouble in the communication path and the packet loss noted above.

Next, a configuration of the control commands which are to be collectively issued by the central control device 20 will be described.

Here, each one of the data memory control device 14 and the communication control device 16 is assigned in advance with a unique identifier, and the control command is designed such that which portion of the control command is to be interpreted and executed can be judged according to an identifier.

Figure 5:
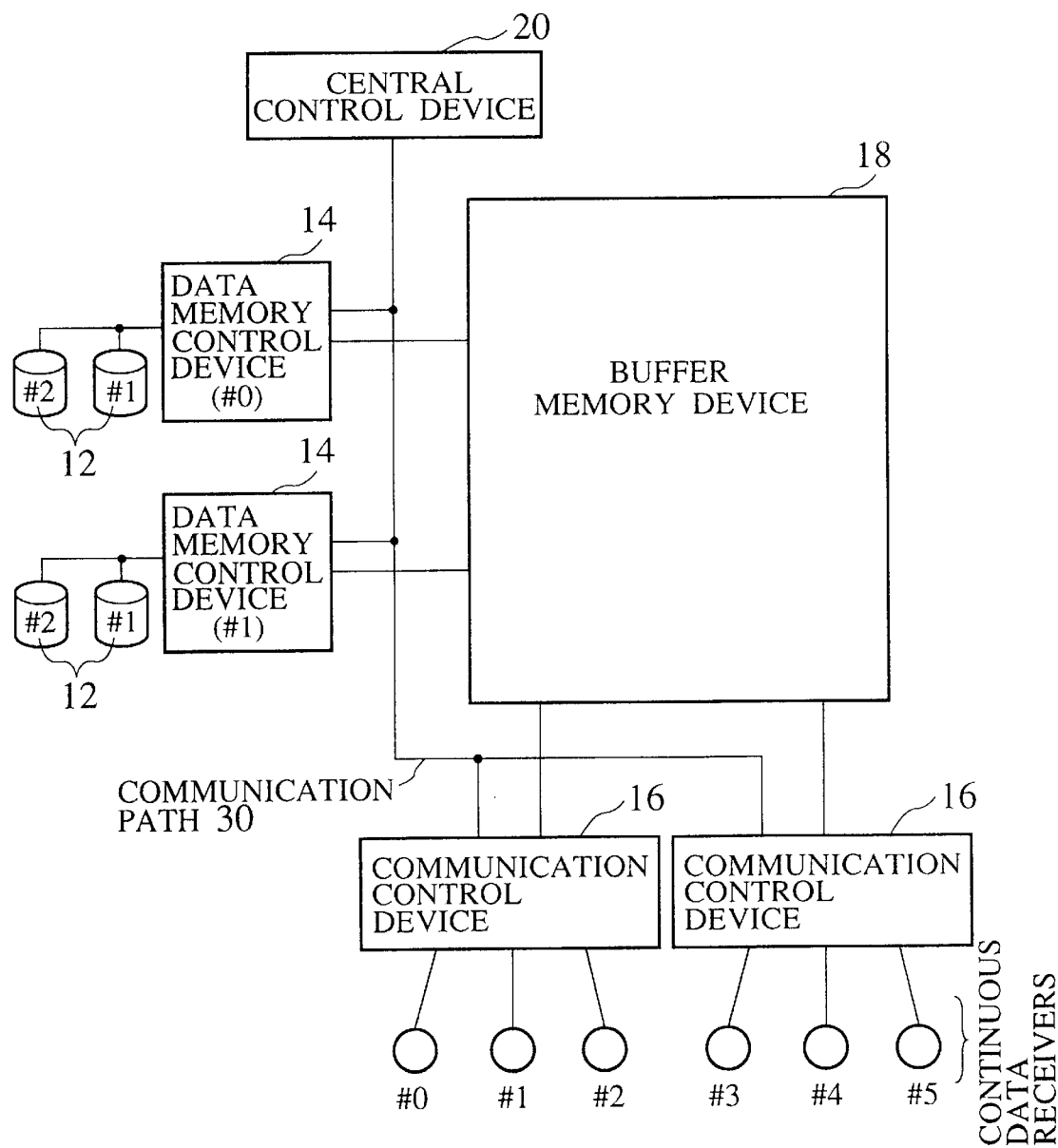
FIG. 5 is a block diagram of an exemplary specific configuration of a continuous data server apparatus in the first embodiment of the present invention.

For example, suppose an exemplary case of the continuous data server apparatus configuration shown in FIG. 5, in which two data memory control devices 14 and two communication control devices 16 are provided, and two data memory devices 12 are connected to each data memory control device 14 while three continuous data receivers are connected to each communication control device 16. An exemplary configuration of the collectively issued control commands for this exemplary case is shown in FIG. 6. Here, the continuous data are divided into units called blocks, which are stored over the data memory devices 12.

Here, a size of each control command for each data memory control device 14 or each communication control device 16 is constant, so that this size is notified to each data memory control device 14 and each communication control device 16 in advance, and the 0-th data memory control device (#0) receives a top data of the collectively issued control commands as the control command for the 0th data memory control device while the 1st data memory control device (#1) receives data which is offset from the top by a size of one control command as the control command for the 1st data memory control device.

The control command for each communication control device 16 is related to continuous data receivers which are connected to each communication control device 16. Here, the central control device 20 assigns a unique identifier to each continuous data receiver, and the control command for each communication control device 16 includes a command concerning each continuous data receiver connected to each communication control device 16. In this example, the 0-th communication control device (#0) is connected with the 0-th to 2nd continuous data receivers (#0 to #2), and the 1st communication control device (#1) is connected with the 3rd to 5th continuous data receivers (#3 to #5). A number of the data memory control devices 14 in this continuous data server apparatus and a size of one control command are notified in advance to each communication control device 16, so that each communication control device 16 can recognize a start of its own control command.

By issuing the control commands in this manner, there is no need for the central control device 20 to issue the control commands for a plurality of times with respect to different ones of the data memory control devices 14 and the communication control devices 16, so that a load on the central control device 20 can be reduced. In addition, a number of times for issuing the control commands also decreases, so that a load on the communication path 30 can also be reduced.

Also, by suitably arranging the continuous data over the data memory devices 12 in advance such that it suffices for all of the the data memory control devices 14 to read out the same block at the same time, it suffices to issue only one control command for all the data memory control devices 14, so that a load on the central control device 20 can be reduced, and an amount of data required for the control can also be reduced.

Note that FIG. 6 shows a format in which the control commands for the data memory control devices 14 are followed by the control commands for the communication control devices 16, but it is also possible to use a format in which the control commands for the communication control devices 16 are followed by the control commands for the data memory control devices 14. In such a case, in order to make it possible for each data memory control device 14 to recognize a start of its own control command, a number of communication control devices 16 in the continuous data server apparatus and a size of one control command are to be notified to each data memory control device 14 in advance.

Figure 7:
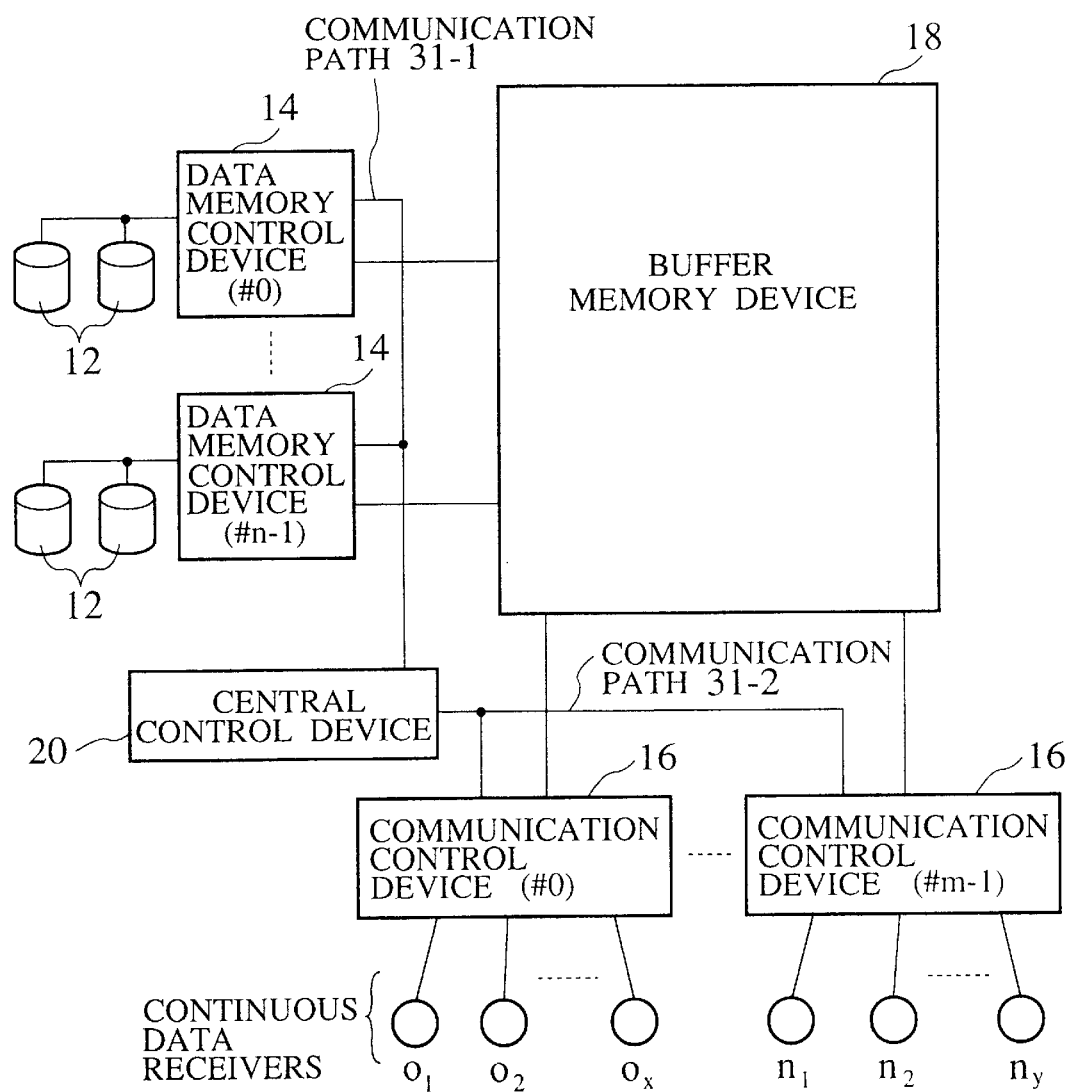
FIG. 7 is a block diagram of a configuration of a continuous data server apparatus in the second embodiment of the present invention.
Figure 8:
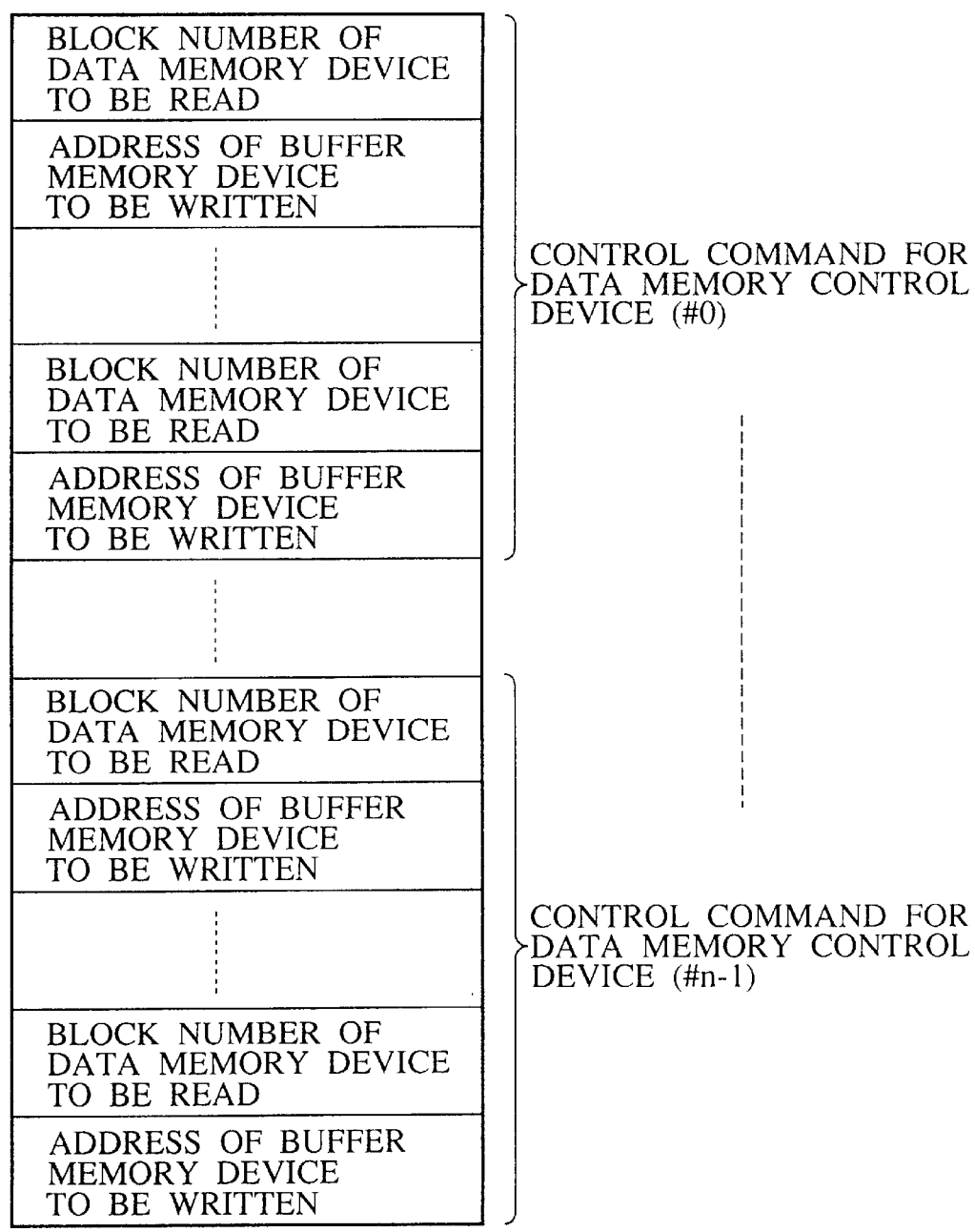
FIG. 8 is a diagram illustrating an exemplary configuration of collectively issued control commands for data memory control devices in the second embodiment of the present invention.
Figure 9:
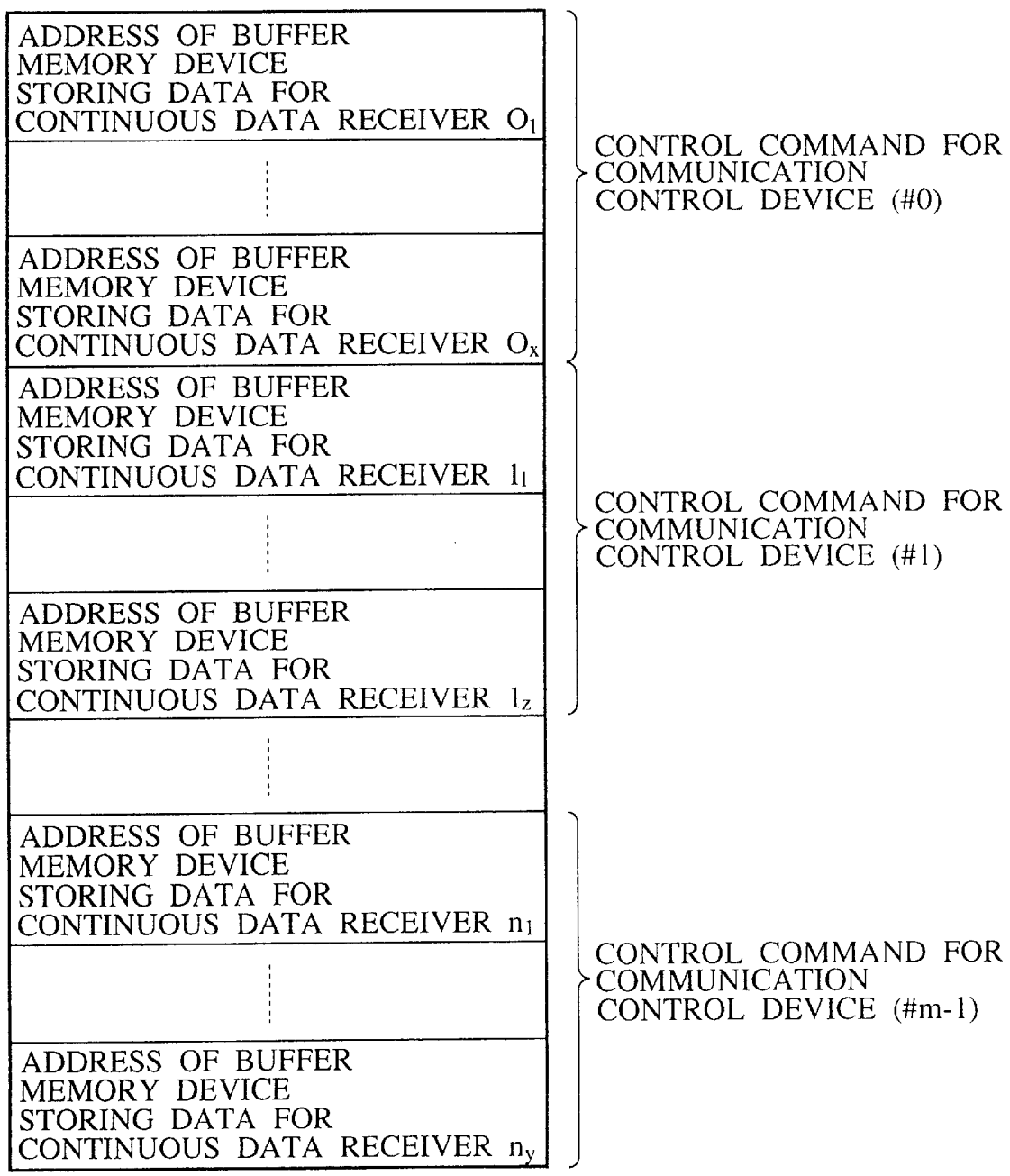
FIG. 9 is a diagram illustrating an exemplary configuration of collectively issued control commands for communication control devices in the second embodiment of the present invention.

Referring now to FIG. 7 to FIG. 9, the second embodiment of a continuous server apparatus and a continuous data server control method according to the present invention will be described in detail.

In short, this second embodiment is directed to a continuous data server apparatus (FIG. 7) in which a communication path for interconnecting the central control device and the data memory control devices and a communication path for interconnecting the central control device and the communication control devices are provided independently, where the control commands for the data memory control devices are collectively issued as a single control command set (FIG. 8) while the control commands for the communication control devices are collectively issued as another single control command set (FIG. 9), so as to reduce an amount of communications in each communication path.

FIG. 7 shows a configuration of the continuous data server apparatus in this second embodiment.

This continuous data server apparatus of FIG. 7 basically has the same function as that of FIG. 3 in the first embodiment, and the corresponding elements are given the same reference numerals in the figures. In the following, the difference from the first embodiment will be mainly described.

The main difference from the first embodiment is that a communication path 31-1 for connecting the central control device 20 with each data memory control device 14 and a communication path 31-2 for connecting the central control device 20 with each communication control device 16 are provided mutually independently in this second embodiment. Note that the communication paths 31-1 and 31-2 are basically similar to the communication path 30 of the first embodiment, but a path with a smaller capacity than the communication path 30 can be used.

In this second embodiment, the central control device 20 generates control commands to be given to the data memory control devices 14 and control commands to be given to the communication control devices 16 as independent sets of control commands, and separately issues a set of the control commands for the data memory control devices 14 and a set of the control commands for the communication control devices 16 through the communication paths 31-1 and 31-2, respectively, instead of collectively issuing the control commands for all the data memory control devices 14 and all the communication control devices 16 as in the case of FIG. 6 showing the first embodiment. FIG. 8 shows an exemplary configuration of the control commands for the data memory control devices 14 and FIG. 9 shows an exemplary configuration of the control commands for the communication control devices 16 in this second embodiment.

By issuing the control commands in this manner, a load of the central control device 20 is heavier compared with the first embodiment as it is necessary to issue the control commands twice, once for the data memory control devices 14 and once the control commands for the communication control devices 16, but there is no need to notify the number of data memory control devices 14 and a size of one control command to each communication control device 16 in advance, and there is also an additional advantage in that an amount of communications in each communication path can be reduced.

Note that each of the communication paths 31-1 and 31-2 2 may be provided in plurality, similarly as in a case of FIG. 4 for the first embodiment.

Referring now to FIG. 10 to FIG. 18, the third embodiment of a continuous server apparatus and a continuous data server control method according to the present invention will be described in detail.

In short, this third embodiment is directed to a continuous data server apparatus (FIG. 10) in which the arrangement of the continuous data on the data memory devices is devised (FIGS. 11A–11D to FIG. 16) to enable use of a common control command (FIG. 17) for all the data memory control devices, so as to reduce a load on the central control device and an amount of communications in a communication path interconnecting the central control device with each data memory control device and each communication control device.

Figure 10:
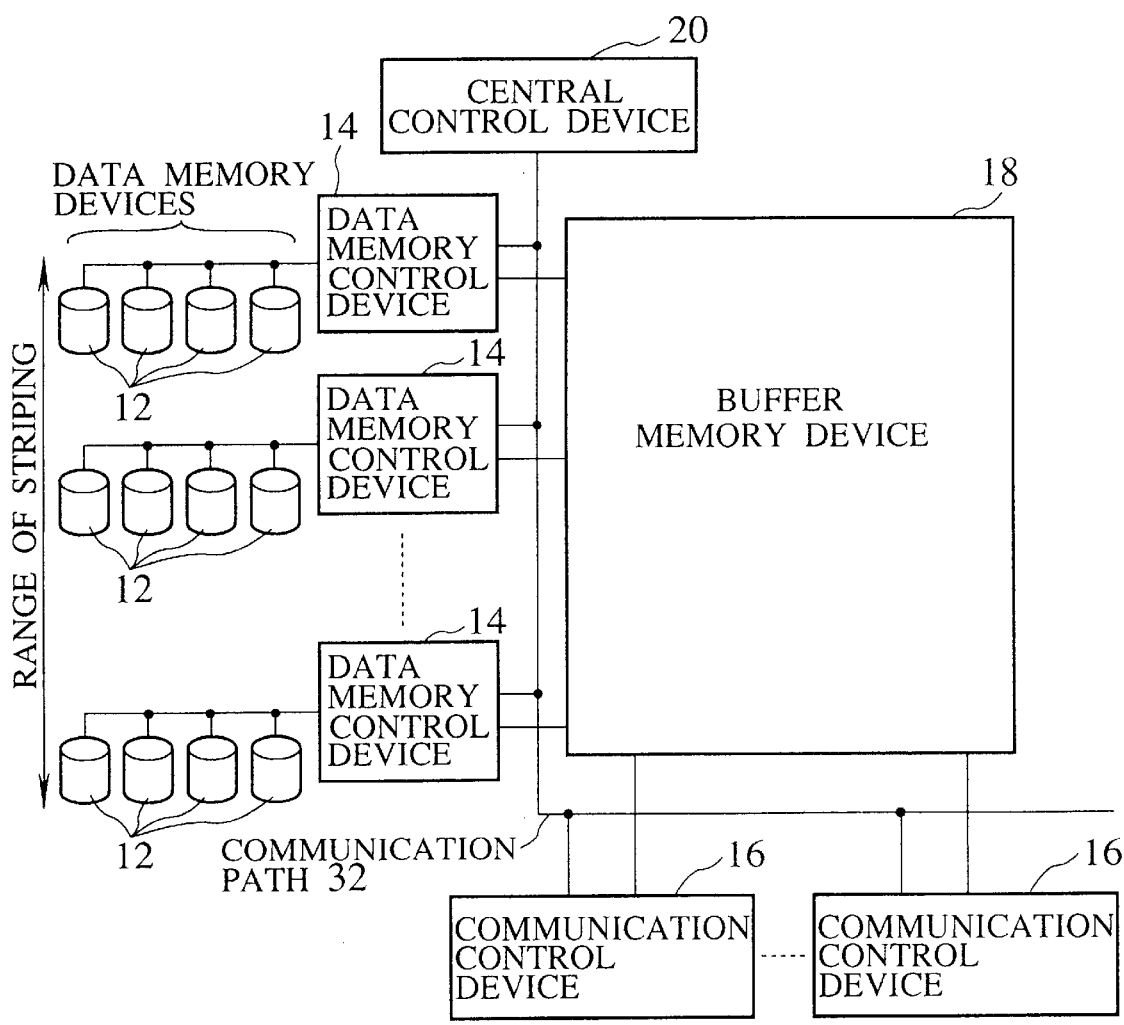
FIG. 10 is a block diagram of a configuration of a continuous data server apparatus in the third embodiment of the present invention.

FIG. 10 shows a configuration of the continuous data server apparatus in this third embodiment.

This continuous data server apparatus of FIG. 10 basically has the same function as that of FIG. 3 in the first embodiment, and the corresponding elements are given the same reference numerals in the figures. In the following, the difference from the first embodiment will be mainly described.

In this third embodiment, the continuous data are stored over the data memory devices 12 by using the striping technique in such a manner that it suffices for all the data memory control devices 14 to read out the same block at the same time, so that it becomes possible to use a common control command for all the data memory control devices 14.

Note that the communication path 32 is basically similar to the communication path 30 of the first embodiment, but a path with a smaller capacity than the communication path 30 can be used.

Figure 12:
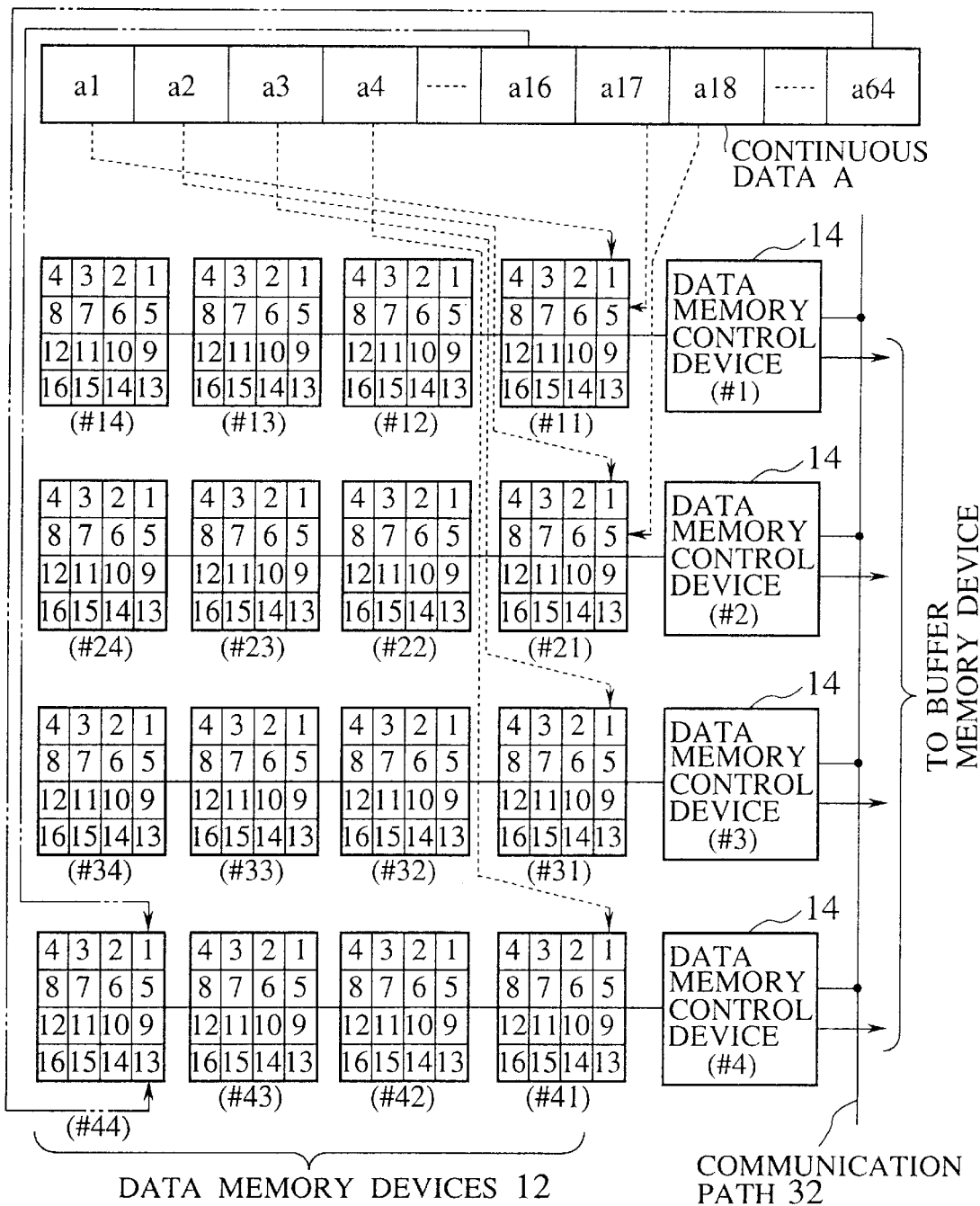
FIG. 12 is a diagram illustrating an exemplary procedure for arranging the continuous data of FIG. 11A over data memory devices in the third embodiment of the present invention.
Figure 13:
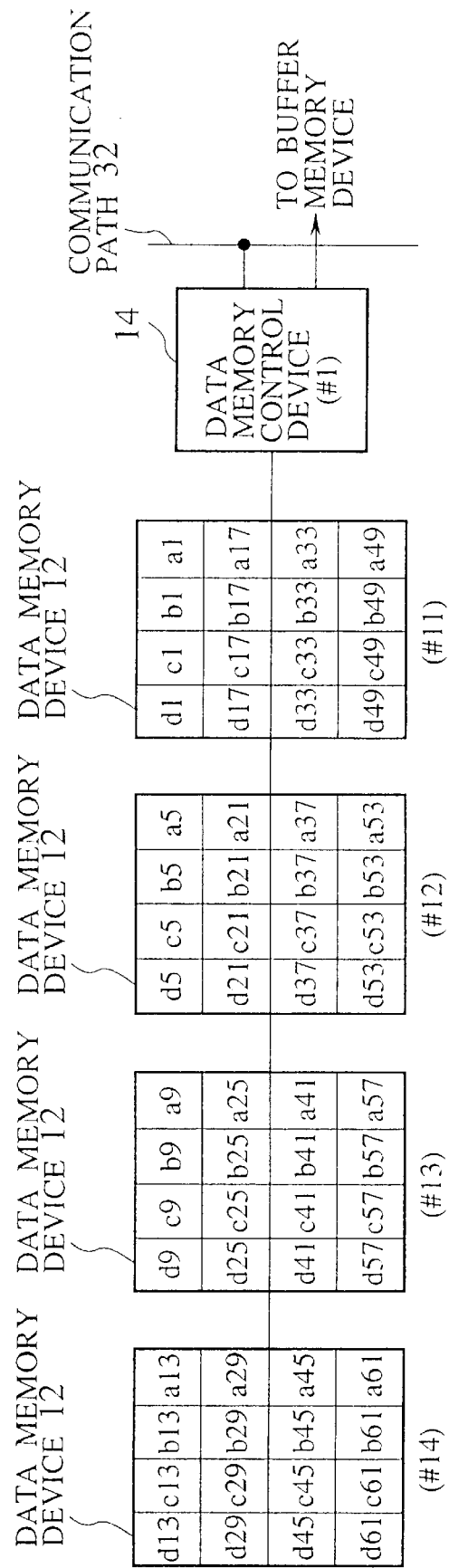
FIG. 13 is a diagram illustrating a part of an exemplary result for an arrangement of the continuous data of FIGS. 11A to 11D over data memory devices in the third embodiment of the present invention.
Figure 14:
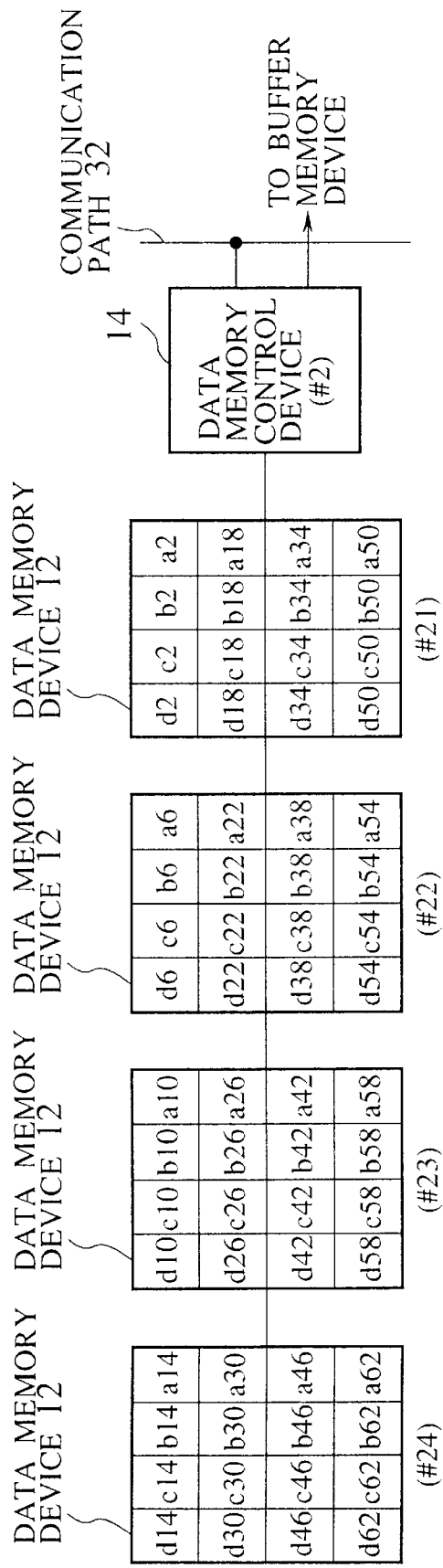
FIG. 14 is a diagram illustrating a part of an exemplary result for an arrangement of the continuous data of FIGS. 11A to 11D over data memory devices in the third embodiment of the present invention.
Figure 15:
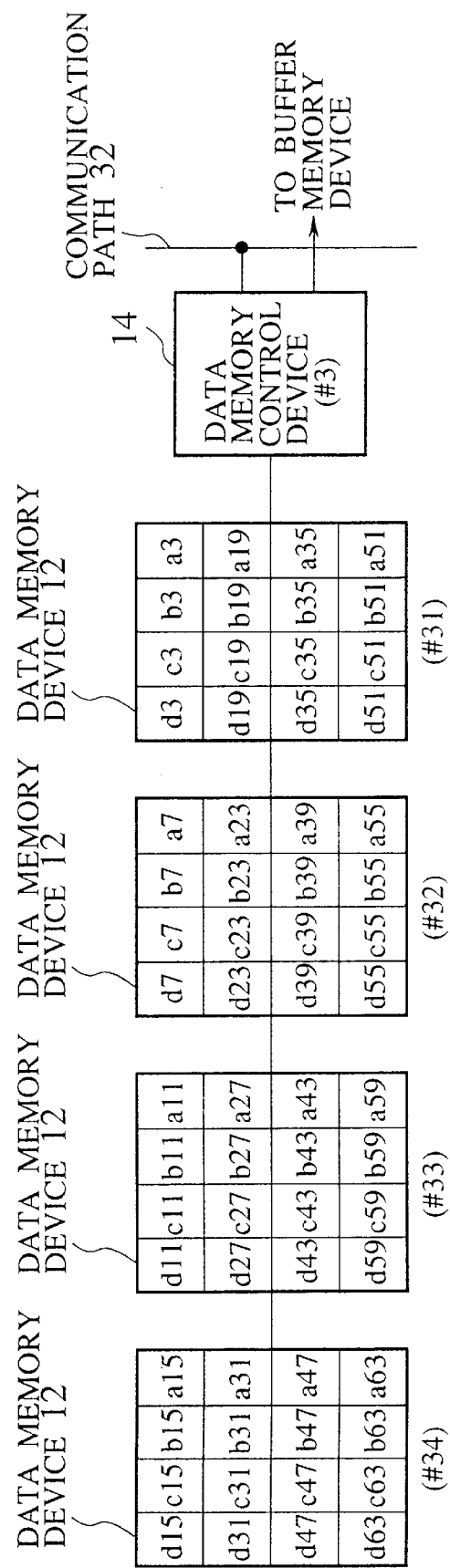
FIG. 15 is a diagram illustrating a part of an exemplary result for an arrangement of the continuous data of FIGS. 11A to 11D over data memory devices in the third embodiment of the present invention.
Figure 16:
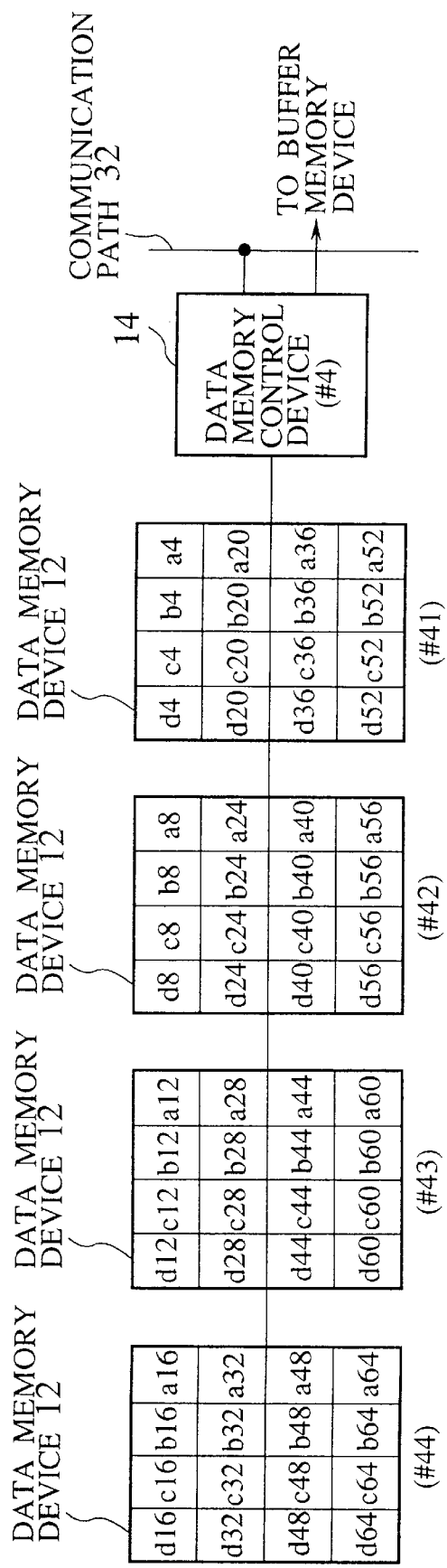
FIG. 16 is a diagram illustrating a part of an exemplary result for an arrangement of the continuous data of FIGS. 11A to 11D over data memory devices in the third embodiment of the present invention.

Now, with references to FIGS. 11A–11D to FIG. 16, the arrangement of the continuous data in this third embodiment will be described. FIGS. 11A to 11D show four exemplary continuous data A to D to be arranged. Here, an exemplary case of using a configuration as shown in FIG. 12 will be described. This configuration of FIG. 12 includes four data memory control devices 14 (#1 to #4), each of which has four data memory devices 12 connected thereto, and each data memory device 12 has 16 blocks. In FIG. 12, the 1st, 2nd, 3rd and 4th data memory devices connected to the 1st data memory control device (#1) are denoted as #11, #12, #13 and #14, respectively. The data memory devices connected to the other data memory control devices (#2 to #4) are similarly denoted as #21 to #24, #31 to #34, and #41 to #44. The continuous data A to D of FIGS. 11A to 11D are arranged over the data memory devices 12 of FIG. 12 as follows.

First, before arranging the continuous data over the data memory devices 12, the continuous data are divided into sizes of blocks used in the data memory devices 12. As a result, each one of the continuous data A to D is divided into 64 blocks (a1 to a64, b1 to b64, c1 to c64, d1 to d64) as shown in FIGS. 11A to 11D, for example.

The divided blocks of the continuous data A are then stored sequentially in such an order that the 1st block a1 is stored into the 1st block of the data memory device #11, the 2nd block a2 is stored into the 1st block of the data memory device #21, the 3rd block a3 is stored into the 1st block of the data memory device #31, the 4th block a4 is stored into the 1st block of the data memory device #41, and so on as shown by the dashed lines in FIG. 12.

When the 16th block a16 is stored into the 1st block of the data memory device #44, a process returns to the data memory device #11, and the 17th block a17 is stored into the 5th block of the data memory device #11, the 18th block a18 is stored into the 5th block of the data memory device #21, and so on, for example.

Then, when the last block a64 is stored into the 13th block of the data memory device #44, for example, the arrangement of the continuous data A is completed.

The continuous data B to D are also arranged by a similar procedure.

An exemplary result of the arrangements of the continuous data A (a1 to a64), the continuous data B (b1 to b64), the continuous data C (c1 to c64), and the continuous data D (d1 to d64) obtained by the above procedure are shown in FIG. 13 to FIG. 16.

By arranging the continuous data in this manner, when it is desired to read out a top portion (a1 to a4) of the continuous data A, for example, it suffices to command each data memory control device 14 to read out the 1st block of the 1st data memory device 12 connected to each data memory control device 14. For instance, according to this command, the 1st data memory control device #1 reads out the block a1 from the 1st block of the data memory device #11.

In other words, when the same data memory device number and the same block number are commanded to the data memory control devices 14, consecutive blocks of the desired continuous data can be read out from the data memory devices in this third embodiment.

An exemplary configuration of the common control command for the data memory control devices 14 in this third embodiment is shown in FIG. 17.

Here, as shown in FIG. 18, when addresses in the buffer memory device 18 into which data are to be written by each data memory control device 14 are determined in advance, it is only necessary to give an offset of the addresses for writing data to each data memory control device 14, and it is possible to use a common control command for all the data memory control devices 14. When this offset is also set identical to all the data memory control devices, all the contents of the control command for each data memory control device 14 can be identical for all the data memory control devices 14.

By arranging the continuous data in this manner, it becomes possible to issue only one control command for all the data memory control devices 14, so that a considerable effect on a reduction of a load on the central control device 20, a reduction of an amount of communications with respect to the data memory control devices 14, and a distribution of access load with respect to the data memory devices 12 can be achieved.

Note that, in this third embodiment, the control command of FIG. 17 can be issued collectively with a set of control commands for the communication control devices 16, or independently from the control commands for the communication control devices 16.

It is to be noted that this third embodiment has been described on a basis of a configuration of the first embodiment in the above, but this third embodiment is also applicable to other configurations such as that of the second embodiment, with similar effects.

As described, according to the present invention, the control commands to be given to the data memory control devices are collected together and collectively issued, while the control commands to be given to the communication control devices are also collected together and collectively issued, or these two sets of control commands are further collected together and collectively issued, so that it becomes possible to control the data memory control devices and the communication control devices by issuing the control commands once or twice, and consequently it becomes possible to reduce a load for issuing control commands on the central control device, as well as an amount of communications on a communication path for interconnecting the central control device with the data memory control devices and the communication control devices.

Also, according to the present invention, by suitably arranging the continuous data over the data memory devices by using the striping technique, it becomes possible to use a common control command for all the data memory control devices, and consequently it becomes possible to further reduce a load for issuing control commands on the central control device, as well as an amount of communications on a communication path for interconnecting the central control device with the data memory control devices and the communication control devices.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A continuous data server apparatus, comprising:

n sets of data memory control devices for reading out desired continuous data from data memory devices storing continuous data, where n is an integer not less than one;

a buffer memory device for holding the desired continuous data read out by the n sets of data memory control devices;

m sets of communication control devices for transferring the desired continuous data held in the buffer memory device to an external communication path, where m is an integer not less than one;

a central control device for controlling the n sets of data memory control devices and the m sets of communication control devices by issuing control commands; and at least one internal communication path for interconnecting the central control device with the n sets of data memory control devices and the m sets of communication control devices;

wherein the central control device issues a control command for each data memory control device and a control command for each communication control device collectively as a single control command set through the at least one internal communication path.

2. The apparatus of claim 1, wherein the at least one internal communication path includes a plurality of paths, each interconnecting the central control device with the n sets of data memory devices and the m sets of communication control devices.

3. The apparatus of claim 1, wherein each data memory control device extracts a control command for each data memory control device from the signal control command set, and reads out the desired continuous data from the data memory devices and writes the desired continuous data into the buffer memory device according to an extracted control command for each data memory control device.

4. The apparatus of claim 1, wherein each communication control device extracts a control command for each communication control device from the single control command set, and reads out the desired continuous data from the buffer memory device and transfer the desired continuous data to the external communication path according to an extracted control command for each communication control device.

5. A continuous data server apparatus, comprising:

n sets of data memory control devices for reading out desired continuous data from data memory devices storing continuous data, where n is an integer not less than one;

a buffer memory device for holding the desired continuous data read out by the n sets of data memory control devices;

m sets of communication control devices for transferring the desired continuous data held in the buffer memory device to an external communication path, where m is an integer not less than one and m is not equal to one when n is equal to one;

a central control device for controlling the n sets of data memory control devices and the m sets of communication control devices by issuing control commands;

at least one first internal communication path for interconnecting the central control device with the n sets of data memory control devices; and at least one second internal communication path for interconnecting the central control device with the m sets of communication control devices;

wherein the central control device issues control commands for the n sets of data memory control devices collectively as a single first control command set through the at least one first internal communication path, and control commands for the m sets of communication control devices collectively as a single second control command set through the at least one second internal communication path.

6. The apparatus of claim 5, wherein the at least one first internal communication path includes a plurality of paths, each interconnecting the central control device with the n sets of data memory control devices.

7. The apparatus of claim 5, wherein the at least one second internal communication path includes a plurality of paths, each interconnecting the central control device with the m sets of communication control devices.

8. The apparatus of claim 5, wherein each data memory control device extracts a control command for each data memory control device from the single first control command set, and reads out the desired continuous data from the data memory devices and writes the desired continuous data into the buffer memory device according to an extracted control command for each data memory control device.

9. The apparatus of claim 5, wherein each communication control device extracts a control command for each communication control device from the single second control command set, and reads out the desired continuous data from the buffer memory device and transfer the desired continuous data to the external communication path according to an extracted control command for each communication control device.

10. A continuous data server apparatus, comprising:

a plurality of data memory control devices for reading out desired continuous data from data memory devices storing continuous data, the continuous data being striped over the data memory devices connected with said plurality of data memory control devices;

a buffer memory device for holding the desired continuous data read out by the data memory control devices;

at least one communication control device for transferring the desired continuous data held in the buffer memory device to an external communication path;

a central control device for controlling the data memory control devices and the at least one communication control device by issuing control commands; and at least one internal communication path for interconnecting the central control device with the data memory control devices;

wherein the central control device issues a common control command for all the data memory control devices through the at least one internal communication path.

11. The apparatus of claim 10, wherein each data memory control device is connected with a plurality of data memory devices identified by sequential data memory device numbers, each data memory device has a prescribed number of blocks identified by sequential block numbers, and the continuous data are striped over the data memory devices such that consecutive blocks of the continuous data are read out at said prescribed number of the data memory control devices by simultaneously reading data of an identical data memory device number and an identical block number.

12. The apparatus of claim 10, wherein addresses of the buffer memory device into which data are to be written by each data memory control device are predetermined, and the common control command specifies an identical offset for an address of the buffer memory device into which the desired continuous data read out by each data memory control device are to be written by each data memory control device.

13. The apparatus of claim 10, wherein each data memory control device reads out the desired continuous data from the data memory devices and writes the desired continuous data into the buffer memory device according to the common control command for all the data memory control devices.

14. The apparatus of claim 10, wherein the at least one internal communication path also interconnects the central control device with the at least one communication control device, and the central control device issues the common control command for all the data memory control devices and a control command for the at least one communication control device collectively as a single control command set through the at least one internal communication path.

15. The apparatus of claim 10, wherein the central control device also issues a control command for the at least one communication control device separately from the common control command for all the data memory control devices.

16. A method for controlling a continuous data server formed by: n sets of data memory control devices for reading out desired continuous data from data memory devices storing continuous data, where n is an integer not less than one; a buffer, memory device for holding the desired continuous data read out by the n sets of data memory control devices; m sets of communication control devices for transferring the desired continuous data held in the buffer memory device to an external communication path, where m is an integer not less than one; a central control device for controlling the n sets of data memory control devices and the m sets of communication control devices by issuing control commands; and at least one internal communication path for interconnecting the central control device with the n sets of data memory control devices and the m sets of communication control devices; the method comprising the steps of:

issuing a control command for each data memory control device and a control command for each communication control device collectively as a single control command set through the at least one internal communication path, from the central control device;

extracting at each data memory control device a control command for each data memory control device from the single control command set, and reading out the desired continuous data from the data memory devices and writing the desired continuous data into the buffer memory device according to an extracted control command for each data memory control device; and extracting at each communication control device a control command for each communication control device from the single control command set, and reading out the desired continuous data from the buffer memory device and transferring the desired continuous data to the external communication path according to an extracted control command for each communication control device.

17. A method for controlling a continuous data server formed by: n sets of data memory control devices for reading out desired continuous data from data memory devices storing continuous data, where n is an integer not less than one; a buffer memory device for holding the desired continuous data read out by the n sets of data memory control devices; m sets of communication control devices for transferring the desired continuous data held in the buffer memory device to an external communication path, where m is an integer not less than one and m is not equal to one when n is equal to one; a central control device for controlling the n sets of data memory control devices and the m sets of communication control devices by issuing control commands; at least one first internal communication path for interconnecting the central control device with the n sets of communication control devices; and at least one second internal communication path for interconnecting the central control device with the m sets of communication control devices; the method comprising the steps of:

issuing control commands for the n sets of data memory control devices collectively as a single first control command set through the at least one first internal communication path, and control commands for the m sets of communication control devices collectively as a single second control command set through the at least one second internal communication path, from the central control device;

extracting at each data memory control device a control command for each data memory control device from the single first control command set, and reading out the desired continuous data from the data memory devices and writing the desired continuous data into the buffer memory device according to an extracted control command for each data memory control device; and extracting at each communication control device a control command for each communication control device from the single second control command set, and reads out the desired continuous data from the buffer memory device and transfer the desired continuous data to the external communication path according to an extracted control command for each communication control device.

18. A method for controlling a continuous data server formed by: a plurality of data memory control devices for reading out desired continuous data from data memory devices storing continuous data, the continuous data being striped over the data memory devices connected with said plurality of data memory control devices; a buffer memory device for holding the desired continuous data read out by the data memory control devices; at least one communication control device for transferring the desired continuous data held in the buffer memory device to an external communication path; a central control device for controlling the data memory control devices and the at least one communication control device by issuing control commands; and at least one internal communication path for interconnecting the central control device with data memory control devices; the method comprising the steps of:

issuing a common control command for all the data memory control devices through the at least one internal communication path, from the central control device; and reading out the desired continuous data from the data memory devices and writing the desired continuous data into the buffer memory device according to the common control command for all the data memory control devices at each data memory control device.

* * * * *